United States Patent
Hewitt et al.

(10) Patent No.: US 9,967,268 B1
(45) Date of Patent: May 8, 2018

(54) IDENTIFYING E-MAIL SECURITY THREATS

(71) Applicant: Wells Fargo Bank, N.A., San Francisco, CA (US)

(72) Inventors: Aimee J. Hewitt, Charlotte, NC (US); Joseph R. Kaluzny, Harrisburg, NC (US); Douglas C. Rambo, Davidson, NC (US); Steven M. Trudeau, Advance, NC (US); Bryan Hall, Charlotte, NC (US); Andrew J. Garner, IV, State Road, NC (US)

(73) Assignee: Wells Fargo Bank, N.A., San Francisco, CA (US)

( * ) Notice: Subject to any disclaimer, the term of this patent is extended or adjusted under 35 U.S.C. 154(b) by 205 days.

(21) Appl. No.: 15/133,107

(22) Filed: Apr. 19, 2016

(51) Int. Cl.
| | |
|---|---|
| *H04L 29/06* | (2006.01) |
| *H04L 12/58* | (2006.01) |
| *G06Q 10/10* | (2012.01) |
| *G06Q 50/00* | (2012.01) |
| *G06F 17/00* | (2006.01) |
| *G06F 11/00* | (2006.01) |
| *G06F 12/14* | (2006.01) |
| *G06F 12/16* | (2006.01) |
| *G08B 23/00* | (2006.01) |

(52) U.S. Cl.
CPC ....... *H04L 63/1416* (2013.01); *G06Q 10/107* (2013.01); *G06Q 50/01* (2013.01); *H04L 51/04* (2013.01); *H04L 63/1425* (2013.01)

(58) Field of Classification Search
None
See application file for complete search history.

(56) References Cited

U.S. PATENT DOCUMENTS

| | | | |
|---|---|---|---|
| 8,768,782 B1 | 7/2014 | Myslinski | |
| 8,856,928 B1* | 10/2014 | Rivner | G06F 21/566 713/193 |
| 9,154,514 B1 | 10/2015 | Prakash | |
| 2011/0307434 A1* | 12/2011 | Rostampour | G06Q 10/107 706/45 |
| 2012/0254333 A1 | 10/2012 | Chandramouli et al. | |
| 2014/0199664 A1 | 3/2014 | Sadeh-Koniecpol et al. | |
| 2014/0245374 A1* | 8/2014 | Deerman | H04L 63/20 726/1 |

(Continued)

OTHER PUBLICATIONS

Rader et al. "Exploring Historical and Emerging Phishing Techniques and Mitigating the Associated Security Risks." International Journal of Network Security & Its Applications vol. 5, No. 4 Jul. 2013, 19 pp.

*Primary Examiner* — Eric Chen
(74) *Attorney, Agent, or Firm* — Shumaker & Sieffert, P.A.

(57) ABSTRACT

One or more processors receive, from one or more social-network sources, social-network data that identifies at least one potentially malicious source accessing a plurality of social-network profiles for a group of users. The one or more processors receive, from one or more e-mail servers, e-mail data associated with a plurality of e-mail messages received by the group of users. The one or more processors determine, based on the social-network data and the e-mail data, that an e-mail message of the plurality of e-mail messages is from the at least one potentially malicious source. The one or more processors output information identifying the e-mail message as being from the potentially malicious source.

17 Claims, 3 Drawing Sheets

(56) References Cited

U.S. PATENT DOCUMENTS

| | | |
|---|---|---|
| 2015/0128274 A1 | 5/2015 | Giokas |
| 2015/0172300 A1 | 6/2015 | Cochenour |
| 2015/0261955 A1 | 9/2015 | Huang et al. |
| 2015/0326608 A1* | 11/2015 | Shabtai ................ H04L 67/306 |
| | | 726/23 |
| 2015/0339477 A1* | 11/2015 | Abrams ................ G06F 21/554 |
| | | 726/23 |
| 2016/0014151 A1* | 1/2016 | Prakash .............. H04L 63/1483 |
| | | 726/22 |

\* cited by examiner

IDENTIFYING E-MAIL SECURITY THREATS

TECHNICAL FIELD

The invention relates to identifying security threats in electronic mail.

BACKGROUND

Phishing is a form of fraud in which an attacker tries to learn information such as login credentials or account information by masquerading as a reputable entity or person in electronic mail (e-mail), instant messaging (IM), or other communication channels. Spear phishing is a type of phishing that targets a specific organization, seeking unauthorized access to confidential data. Spear-phishing attempts may be conducted, for example, by perpetrators out for financial gain, trade secrets, and/or military information.

As with e-mail messages used in regular phishing expeditions, spear-phishing messages appear to come from a trusted source. Phishing messages might appear to come from a large and well-known company or web site with a broad membership base, such as eBay™ or PayPal™. In the case of spear-phishing, however, the apparent source of the e-mail may be an individual within the recipient's own company and/or someone in a position of authority.

The following is one example of a spear-phishing attack. A perpetrator finds a web page of their target organization that supplies contact information for a group of employees of the target organization. Using available details to make the message appear authentic, the perpetrator drafts an e-mail to an employee included on the contact page. The e-mail appears to come from an individual who might reasonably request confidential information, such as a network administrator. The e-mail asks the employee to log into a bogus page that requests the employee's user name and password or click on a link that will download spyware or other malicious programming onto the employee's computer. If a single employee falls for the spear-phisher's ploy, the attacker can masquerade as that employee and use social engineering techniques to gain further access to sensitive data.

SUMMARY

In general, this disclosure describes techniques for identifying security threats including, for example, a spear-phishing attempt in electronic mail (e-mail). In order to present a robust, effective, and technically efficient system for identifying a spear-phishing attempt, the disclosed techniques enable a security unit running on an administrator computer to perform actions including analyzing social-network and e-mail data to identify an e-mail message that is from a potentially malicious source, such as a spear-phishing source. The techniques further enable the security unit to output information identifying the e-mail message as being from the potentially malicious source to e-mail servers. The identifying information may include, for example, an alert to a recipient of the e-mail message or instructions to block or otherwise process the message and/or all messages from the potentially malicious source.

According to the disclosed techniques, the security unit may be configured to analyze page-view and/or page content information from the social-network data, and compare that data to data in received e-mail messages. For example, the security unit may determine that a source has accessed social-network profile pages for several individuals within an organization that are associated with an e-mail recipient prior to the source sending the e-mail message to the e-mail recipient. Alternatively or in addition, the security unit may determine that the e-mail message from the source includes information similar to page content found on the social-network profile pages accessed by the source. Based on this analysis, the security unit may determine that the source is a potentially malicious source and may alert the e-mail recipient or instruct the e-mail servers to process the e-mail message, such as by blocking, highlighting, filtering and/or labeling the e-mail message. The security unit may collect and analyze large amounts of data from multiple sources, including from e-mail servers, social-networks, the organization, and/or other parties, to more accurately identify potential spear-phishing attempts.

In one example, this disclosure is directed to a method comprising receiving, by one or more processors of a computing device and from one or more social-network servers, social-network data that identifies at least one potentially malicious source accessing a plurality of social-network profiles for a group of users. The method further comprises receiving, by the one or more processors and from one or more e-mail servers, e-mail data associated with a plurality of e-mail messages received by the group of users. The method further comprises determining, by the one or more processors and based on the social-network data and the e-mail data, that an e-mail message of the plurality of e-mail messages is from the at least one potentially malicious source. The method further comprises outputting, by the one or more processors, information identifying the e-mail message as being from the potentially malicious source.

In another example, this disclosure is directed to a computing device comprising one or more storage units and one or more processors in communication with the storage units. The one or more processors are configured to receive, from one or more social-network sources, social-network data that identifies at least one potentially malicious source accessing a plurality of social-network profiles for a group of users. The one or more processors are further configured to receive, from one or more e-mail servers, e-mail data associated with a plurality of e-mail messages received by the group of users. The one or more processors are further configured to determine, based on the social-network data and the e-mail data, that an e-mail message of the plurality of e-mail messages is from the at least one potentially malicious source. The one or more processors are further configured to output information identifying the e-mail message as being from the potentially malicious source.

In a further example, this disclosure is directed to a non-transitory computer-readable storage medium having stored thereon instructions that, when executed, cause a processor to receive, from one or more social-network sources, social-network data that identifies at least one potentially malicious source accessing a plurality of social-network profiles for a group of users; receive, from one or more e-mail servers, e-mail data associated with a plurality of e-mail messages received by the group of users; determine, based on the social-network data and the e-mail data, that an e-mail message of the plurality of e-mail messages is from the at least one potentially malicious source; and output information identifying the e-mail message as being from the potentially malicious source.

The details of one or more examples of the invention are set forth in the accompanying drawings and the description below. Other features, objects, and advantages of the invention will be apparent from the description and drawings, and from the claims.

DETAILED DESCRIPTION

Figure 1:
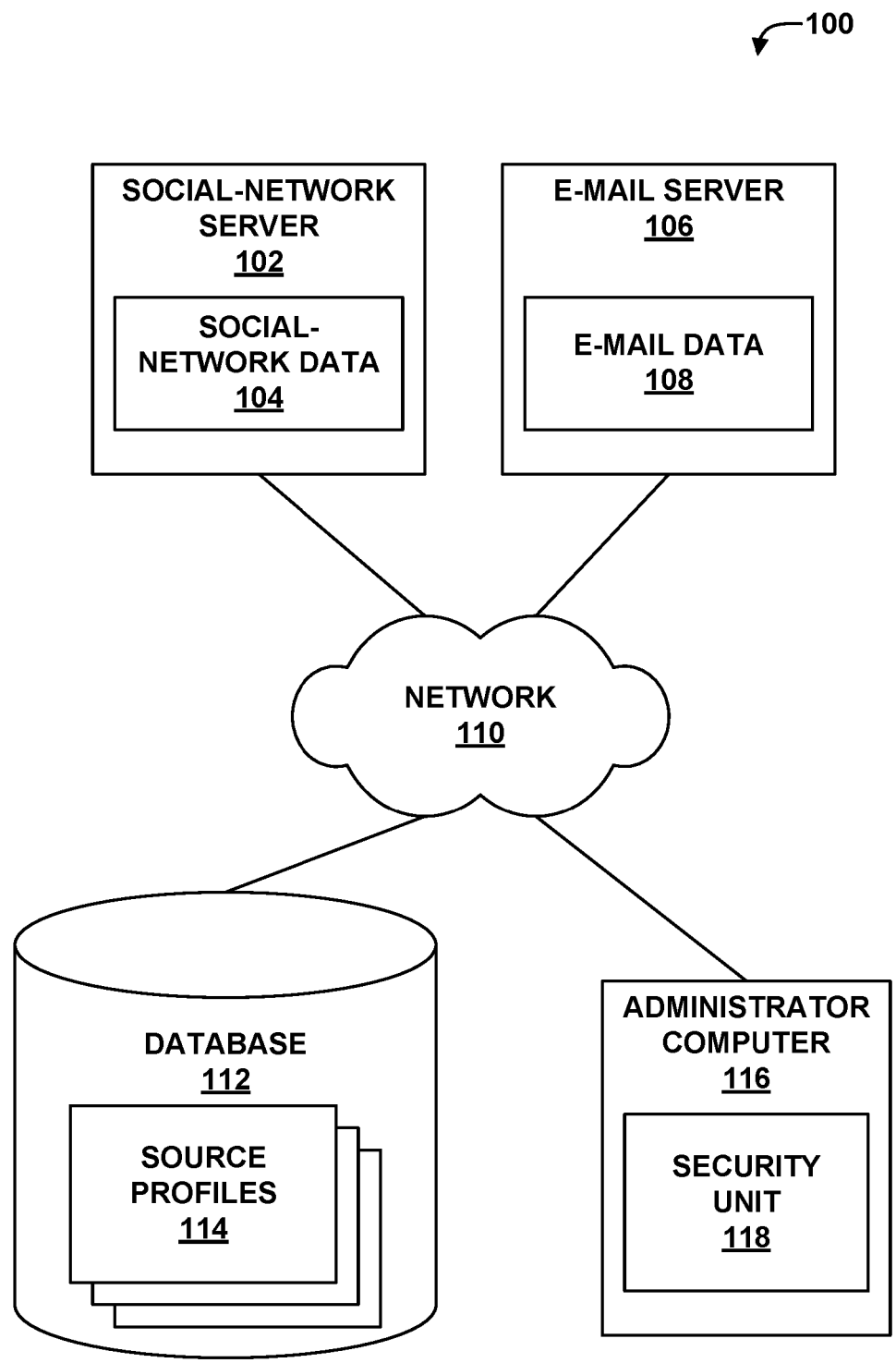
FIG. 1 is a block diagram illustrating an example security system that includes a security unit configured to identify a spear-phishing attempt, based on social-network data and e-mail data, and provide remedial action, in accordance with the techniques of this disclosure.

FIG. 1 is a block diagram illustrating an example security system 100 that includes a security unit 118 configured to identify a spear-phishing attempt, based on social-network data 104 and e-mail data 108, and provide remedial action, in accordance with the techniques of this disclosure.

In this example, security system 100 includes administrator computer 116, database 112, social-network server 102, and e-mail server 106 in communication with each other via network 110. Social-network server 102 may include social-network data 104. E-mail server 106 may include e-mail data 108. Database 112 may include source profiles 114. Administrator computer 116 may include security unit 118. Although FIG. 1 only illustrates one social-network server 102, one e-mail server 106, one database 112, and one administrator computer 116, in other examples security system 100 may include more than one of any of social-network server 102, e-mail server 106, database 112, and administrator computer 116.

Network 110 may comprise a private network including, for example, a private network associated with an organization, or may comprise a public network, such as the Internet. Although illustrated in FIG. 1 as a single entity, in other examples network 110 may comprise a combination of public and/or private networks.

Social-network server 102 may be one or more servers storing information associated with one or more social-network websites, including public social-network websites, such as, for example, LinkedIn™, or directories, such as a company directory. Social-network server 102 may be configured to generate, store, and transmit social-network data 104 associated with the one or more social-network websites. For example, social-network server 102 may store social-network data 104, including data associated with one or more users or profiles of a social-network website, and may include one or more interfaces for transmitting social-network data 104 to security unit 118 via network 110. Social-network server 102 may also be configured to transmit and receive social-network data 104 from one or more other sources including database 112 and/or one or more user devices of users and/or administrators of a social-network website.

Social-network data 104 may include, for example, page-view information associated with accessed social-network profiles. For example, social-network data 104 may identify pages and/or profiles of a social-network site viewed by particular sources, and may identify the particular sources based on an Internet Protocol (IP) address used to access those pages and/or profiles. Social-network data 104 may include profile-content information including information contained in one or more pages and/or profiles of one or more social-network sites. Social-network data 104 may associate the sources that have accessed the pages and/or profiles of the social-network sites with the profile-content information.

Social-network data 104 may also include relationship information associating one or more profiles with one or more other profiles. For example, in the case of a social-network site, such as LinkedIn™, the social-network data 104 may identify two profiles as being "connected," which may occur if a first user of one profile sends an invitation to connect to a second user of another profile and the second user accepts. As another example, a company directory, or a public site such as LinkedIn™, may list profiles for two or more individuals and the profiles may be associated with the same group, such as, for example, a company, and/or the same sub-group, such as, for example, a division within the company. Social-network data 104 may include information identifying such associations.

E-mail server 106 may be a server for storing and transmitting information for facilitating and managing e-mail communications within an organization. For example, e-mail server 106 may receive e-mail messages to and from users within an organization, and may store, process, and/or transmit those messages to and/or from users within the organization. In some examples, e-mail server 106 may store incoming messages and send copies of the messages to individual devices of recipients while still retaining copies of the messages. Having one or more centralized e-mail servers 106 may allow an organization to manage e-mail communication and storage centrally, as well as search for potential e-mail security threats using information stored in and accessed from a centralized location.

E-mail data 108 may include, for example, data relating to e-mail messages originated from or intended for one or more users. For example, e-mail data 108 may include messages associated with users within an organization that may be routed to and/or from devices associated with those users. E-mail data 108 may include content of an e-mail message, including information in the e-mail body and subject line, attachments, as well as a sender and one or more intended recipients. E-mail data 108 may also include an IP address of a computing device from which an e-mail message was sent.

Database 112 may be a data structure for storing data related to the security system 100 including source profiles 114. Database 112 may be stored by any suitable party and in any suitable location according to particular needs. For example, database 112 may be stored and maintained by an organization associated with security system 110 or by a third-party vendor that stores and maintains data. Although illustrated as a single database 112, any suitable number of databases may be used for storing the data described according to particular needs. Although shown as being separate from administrator computer 116, in certain examples, database 112 may be stored and executed within administrator computer 116.

Source profiles 114 stored in database 112 may include profile information for particular sources of social-network access tracked by social-network server 102 and/or e-mail messages received by e-mail server 106. A particular source may be identified by, for example, a particular IP address, and the associated one of source profiles 114 may include identifying information useful in identifying whether the particular source is potentially malicious. For example, security unit 118 may access information regarding a particular source from social-network data 104, including page-view information, page-content information associated with the pages accessed by the source, and/or relationship data associated with pages accessed by the source to identify whether a source might be potentially malicious. As another example, security unit 118 may access information regarding a particular source from e-mail data 108 associated with e-mail messages originating from the source to identify whether a source might be potentially malicious. Relevant information regarding the particular source's social-network and e-mail activities may be stored in a source profile 114, may be updated on a periodic basis and/or as soon as new relevant information is received by security unit 118. Source profiles 114 may include indications of whether the associated sources are potentially malicious sources and/or are sources to continue monitoring. Monitoring the source may include monitoring for social-network accesses and e-mail messages originating or sent from the source.

Administrator computer 116 may be associated with one or more organizations including, for example, a corporation or other organization. Administrator computer 116 may be a centralized computing device configured to execute security unit 118 for identifying potentially malicious sources of e-mail messages, including sources that are potentially attempting a spear-phishing campaign. Administrator computer 116 may comprise a cluster of one or more computers, workstations, servers, and the like. Administrator computer 116 configured to execute security unit 118 may be physically or virtually included within an internal network of an organization. Alternatively, administrator computer 116 configured to execute security unit 118 may be physically or virtually included in a network hosted by a third-party vendor. For example, a vendor of an organization may store and maintain security unit 118 for an organization and/or may provide the functions of security unit 118 as a service to an organization.

Security unit 118 running on administrator computer 116 may receive and analyze social-network data 104 and e-mail data 108 to identify an e-mail message that is from a potentially malicious source, such as a spear-phishing source. Security unit 118 may also output information identifying the e-mail message as being from the potentially malicious source to e-mail server 106. The information identifying the e-mail message as being from the potentially malicious source may include, for example, an alert to a recipient of the e-mail message or instructions to block or otherwise process the message and/or all messages from the potentially malicious source.

According to the disclosed techniques, security unit 118 may be configured to analyze page-view and/or page content information from social-network data 104, and compare that data to data in received e-mail messages from e-mail data 108. For example, security unit 118 may determine that a source has accessed social-network profile pages for several individuals within an organization that are associated with an e-mail recipient prior to the source sending the e-mail message to the e-mail recipient. Alternatively or in addition, security unit 118 may determine that the e-mail message from the source includes information similar to page content found on the social-network profile pages accessed by the source. Based on this analysis, security unit 118 may determine that the source is a potentially malicious source, and may alert the e-mail recipient or instruct e-mail server 106 to perform a certain type of processing for the e-mail message, such as blocking, highlighting, filtering and/or labeling the e-mail message. In this way, security unit 118 may collect and analyze large amounts of data from multiple sources, including from e-mail server 106, social-network server 102, the organization, and/or other parties, to more accurately identify potential spear-phishing attempts.

Figure 2:
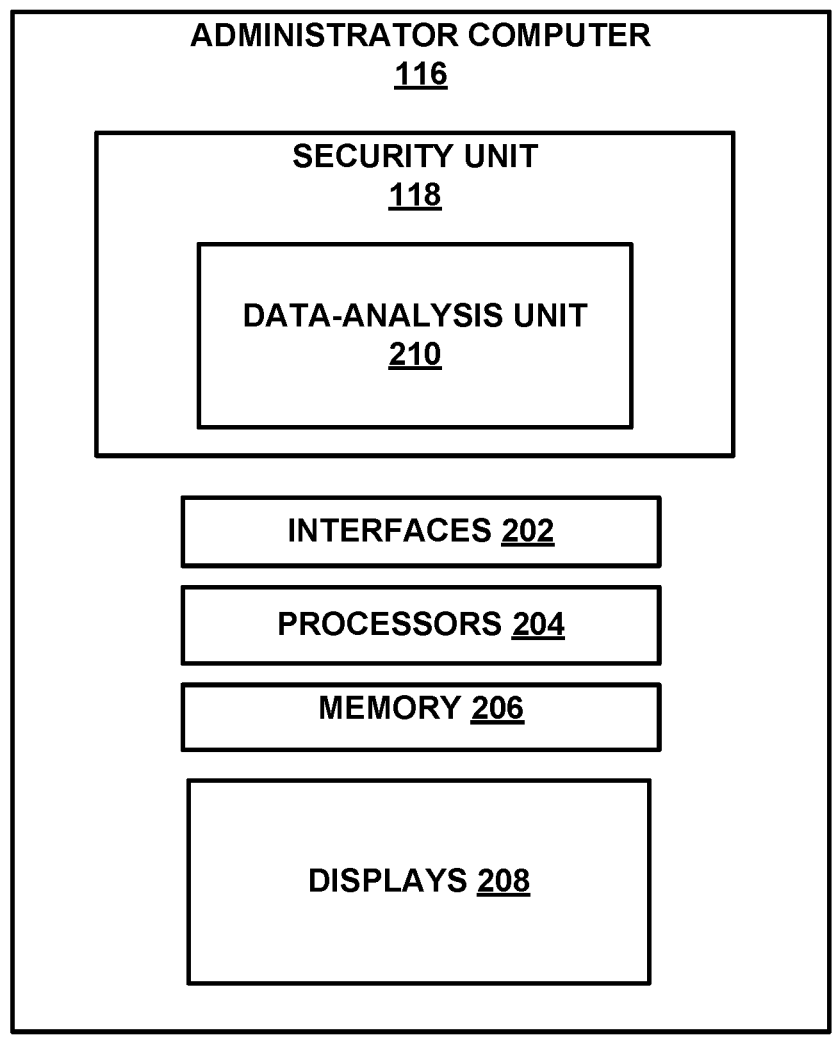
FIG. 2 is a block diagram illustrating an example administrator computer of FIG. 1 in further detail.

FIG. 2 is a block diagram illustrating an example administrator computer 116 of FIG. 1 in further detail. Administrator computer 116 may include security unit 118 of FIG. 1, interfaces 202, processors 204, memory 206, and displays 208.

Administrator computer 116 may include one or more interfaces 202 for allowing security unit 118 to communicate with one or more databases (e.g., database 112), servers (e.g. social-network server 102 and/or e-mail server 106), devices and/or networks via one or more networks, e.g. network 110. The one or more interfaces 202 may include one or more network interface cards, such as Ethernet cards, and/or any other types of interface devices that can send and receive information. In some examples, security unit 118 utilizes the one or more interfaces 202 to communicate with database 112, social-network server 102, e-mail server 106 and/or any other suitable device. Any suitable number of interfaces may be used to perform the described functions according to particular needs.

Administrator computer 116 may include one or more processors 204 configured to implement functionality and/or process instructions for execution within security unit 118. Processors 204 may include, for example, microprocessors, digital signal processors (DSPs), application specific integrated circuits (ASICs), field-programmable gate arrays (FPGAs), and/or equivalent discrete or integrated logic circuitry.

Administrator computer 116 may include memory 206 configured to store information within administrator computer 116. Memory 206 may include a computer-readable storage medium or computer-readable storage device. In some examples, memory 206 may include one or more of a short-term memory or a long-term memory. Memory 206 may include, for example, random access memories (RAM), dynamic random access memories (DRAM), static random access memories (SRAM), magnetic hard discs, optical discs, floppy discs, flash memories, or forms of electrically programmable memories (EPROM), or electrically erasable and programmable memories (EEPROM). In some examples, memory 206 may store logic (e.g., logic of security unit 118) for execution by one or more processors 204. In further examples, memory 206 may be used by security unit 118 to temporarily store information during program execution.

Administrator computer 116 may include one or more displays 108 for displaying a graphical user interface (GUI) that may allow a user, e.g., a system administrator, to interact with administrator computer 116 by display of graphical icons and visual indicators. For example, displays 208 may present one or more GUIs that display information regarding sources identified as being potentially malicious and/or e-mail messages identified as being from a potentially malicious source. In certain examples, any of the displays 208 may be a touch sensitive screen and may present one or more touch sensitive GUI elements. For example, a user may be able to interact with display 208 to respond to options displayed on display 208 and initiate an action by touching one or more of the touch sensitive GUI elements displayed on display 208. For example, display 208 may be a presence-sensitive display that displays a GUI and receives input from a user using capacitive, inductive, and/or optical detection at or near the presence sensitive display. Alternatively or in addition, a user may be able to interact with a device to respond to options displayed on display 208 and initiate an action by using any suitable input device such as, for example, a keyboard, touchpad, and/or any other suitable input device. Display 208 may comprise a cathode ray tube (CRT) monitor, a liquid crystal display (LCD), organic light emitting diode (OLED), or any other type of display device that can generate intelligible output to a user.

Security unit 118 may include instructions executed by one or more processors 204 of administrator computer 116 to perform the functions of security unit 118 as described herein. Security unit 118 may include rules for identifying a potential spear-phishing attempt based on information retrieved from database 112, social-network server 102, e-mail server 106, and/or any other suitable information for determining a recommended action.

Security unit 118 may access, via network 110, social-network data 104. For example, administrator computer 118 includes one or more interfaces 202 and may receive, by the one or more interfaces 202 and from social-network server 102, social-network data 104. The received social-network data 104 may include, for example, page-view information identifying pages and/or profiles of one or more social-network sites accessed by a particular source based on an Internet Protocol address used to access those pages, or other identifying information, such as an originating e-mail address. The received social-network data 104 may further include profile-content information including information contained in one or more pages and/or profiles of the one or more social-network sites accessed by the particular source. The received social-network data 104 may further include relationship information associating one or more pages and/or profiles of the one or more social-network sites with one or more other pages and/or profiles.

Security unit 118 may also access, via network 110, e-mail data 108. For example, administrator computer 116 may receive, by one or more interfaces 202 and from one or more devices including, for example, e-mail server 106, e-mail data 108. The received e-mail data 108 may include, for example, one or more e-mail messages, including content contained in the message, the intended recipient of the message, the identified sender of the message, and a source of the message, including, for example, an IP address of a computing device from which the message originated or was sent and/or an e-mail address from which the messaged was sent.

In operation, according to aspects of this disclosure, security unit 118 may be used to determine and communicate a potential threat, such as a message from a potentially malicious source, such as a message attempting to perform spear-phishing, to a user (e.g., a system administrator) of administrator computer 116, or to any other suitable party according to particular needs.

Security unit 118 may include a data-analysis unit 210 for analyzing data including, for example, social-network data 104 and e-mail data 108. Data-analysis unit 210 may, for example, determine that an e-mail message is from the at least one potentially malicious source based on the social-network data 104 and the e-mail data 108. For example, data-analysis unit 210 may determine that a source associated with a particular IP address has accessed or viewed pages of one or more social-network profiles of users within an organization, and has sent one or more e-mail messages to an e-mail address of one of the users within the organization that is associated with the one or more accessed social-network profiles. For example, the recipient e-mail address may be associated with a social-network profile that has a relationship with the accessed one or more social-network profiles. For example, the recipient e-mail address may have the same owner as a social-network profile that is linked to the one or more accessed social-network profiles. As another example, data-analysis unit 210 may compare page-content of pages and/or profiles accessed by the source with content within an e-mail message sent from the source. For example, data-analysis unit 210 may determine that content of a received message includes similar content to one or more pages or profiles viewed by the source. This may indicate that the source is attempting to appear familiar with the e-mail recipient or acquaintances and/or colleagues of the e-mail recipient in order to gain trust.

Data-analysis unit 210 may also compare timing of page views or access to social-network profiles and received e-mail messages to determine whether a source is potentially malicious. For example, data-analysis unit 210 may determine that a particular source sent an e-mail message to a recipient associated with pages and/or profiles viewed by the particular source shortly before sending the e-mail message. As another example, data-analysis unit 210 may determine that a particular source sent an e-mail message with content similar to page content on one or more pages and/or profiles viewed by the particular source shortly before sending the e-mail message.

In some examples, security unit 118 may output information identifying the received e-mail message as being from a potentially malicious source. For example, security unit 118 may send the information to one or more devices including, for example, e-mail server 106, administrator computer 116, and/or one or more devices associated with the intended e-mail recipient. The information identifying the e-mail message as being from a potentially malicious source may include a type of processing for the e-mail message, such as of blocking, filtering, highlighting, or labeling the e-mail message. In some examples, the information identifying the e-mail message as being from a potentially malicious source may include a type of processing for all e-mail messages from the source, such as blocking, filtering, highlighting, or labeling the e-mail messages.

Upon receipt of the information identifying the received e-mail message as being from a potentially malicious source, e-mail server 106, administrator computer 116, and/or any other device receiving the information may, for example, process an e-mail message according to the type of processing indicated in the received information. In other examples, the information identifying the received e-mail message as being from a potentially malicious source may not include a type of processing for the e-mail message and the receiving device may include logic for determining how to process of the e-mail message. In other examples, a receiving device, such as, for example, administrator computer 116, may store the information for accessing by a user, such as a system administrator. The system administrator may access the information and make decisions regarding actions to take in response to the information.

According to aspects of this disclosure, security unit 118 may generate a source profile for a particular source based on the social-network data 104, may store the source profile in database 112 or any suitable location, and may determine that the source is a potentially malicious source based on the source profile. In some examples, security unit 118 may generate a source profile for a source upon identifying suspicious social-network activity by the source. For example, security unit 118 may determine, based on social-network data 104, that a single source has accessed a large number of profiles associated with an organization. As a result, security unit 118 may generate a source profile including, for example, the IP address or other identifying information for the source and/or the profile-view information and/or other social-network data 104 associated with the source. The source profile may identify the source as being suspicious. Security unit 118 may monitor for e-mail messages received from the source based on the source profile identifying the source as being suspicious. In some examples, the source profile may be used to quickly and efficiently access relevant information about a particular source when a message is identified as being received from the source. In some examples, a source profile may further indicate that a spear-phishing attempt by the source has been identified in the past. In some examples, the source profile may indicate a type of processing for all e-mails from the source. For example, if a source has been identified as having made a spear-phishing attempt in the past, a source profile for that source may include information indicating that all e-mail messages from that source should be blocked.

In this way, certain techniques of this disclosure may, in some instances, provide a technical solution to identifying and preventing a spear-phishing attempt. For example, security unit 118 may gather and analyze large amounts of data from multiple sources to more accurately identify potential spear-phishing attempts. More accurate prediction may result in more efficient and effective thwarting of spear-phishing attempts and may therefore result in reduction in lost and/or required resources, including human, capital, and technological resources. For example, more effective thwarting of spear-phishing attempts may result in fewer financial and technological losses due to theft and/or damage caused by a spear phisher. Additionally, fewer resources may be required to repair damage caused by a successful spear-phishing campaign.

Figure 3:
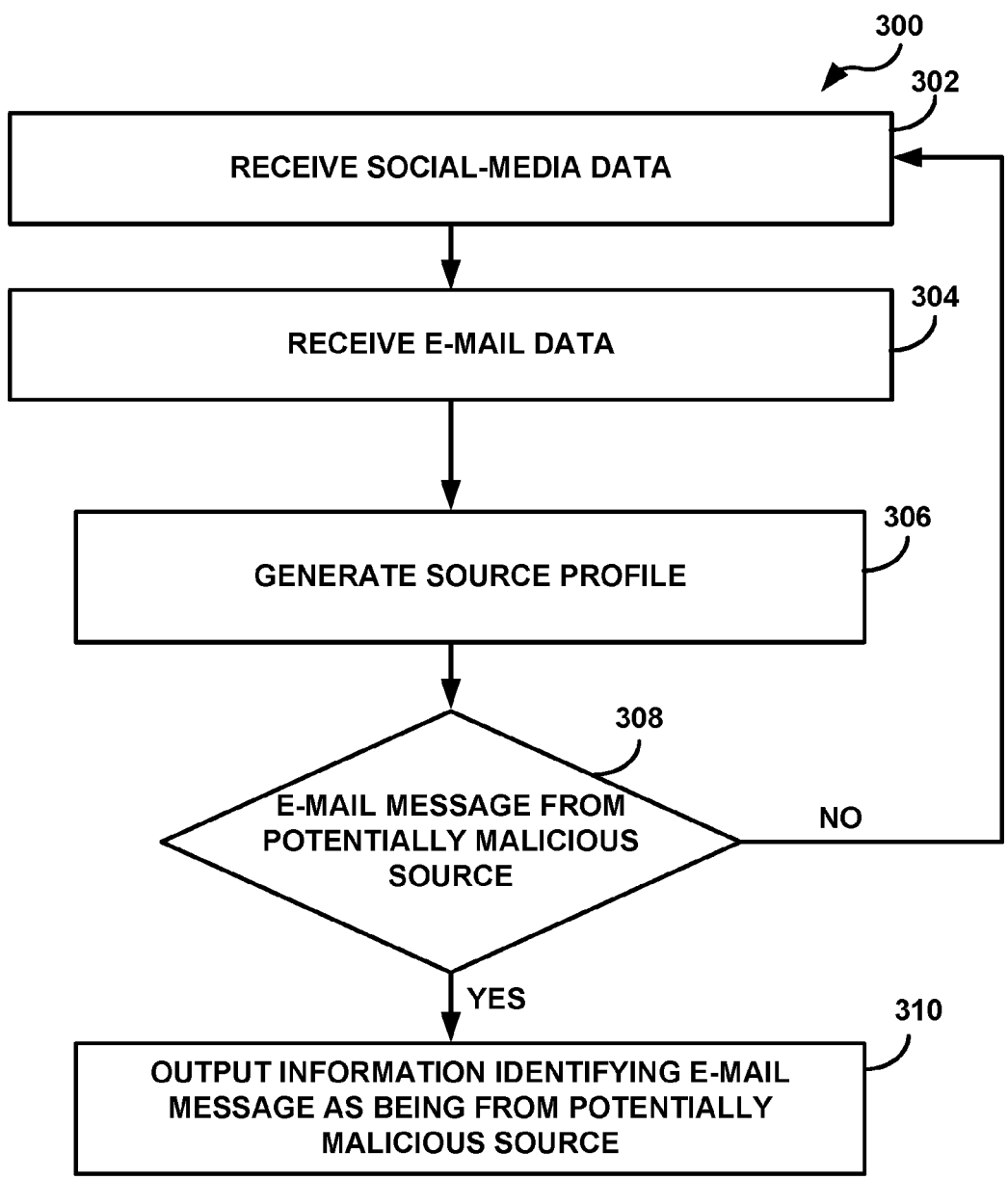
FIG. 3 is a flowchart illustrating an example operation of a security unit of the security system, in accordance with the techniques of this disclosure.

FIG. 3 is a flowchart illustrating an example operation 300 of security unit 118 running on administrator computer 116 of the security system 100, in accordance with the techniques of this disclosure. The example operation 300 is described with respect to security unit 118 of administrator computer 116 of FIG. 1.

Security unit 118 may receive social-network data 104 (302). For example, security unit 118 may receive social-network data 104 from social-network server 102. As described above with reference to FIG. 1, social-network data 104 may include, for example, page-view information associated with accessed social-network profiles. In some examples, security unit 118 may receive social-network data 104 as it is created and stored in social-network server 102 or may receive social-network data 104 at scheduled periodic intervals, as requested by a user of administrator computer 116, or in any other suitable manner, according to particular needs.

For example, social-network data 104 may identify pages and/or profiles of a social-network site viewed by particular users based on an Internet Protocol (IP) address used to access those pages. Social-network data 104 may include profile-content information including information contained in one or more pages and/or profiles of one or more social-network sites and associated with one or more sources that have accessed the pages and/or profiles containing such content. Social-network data 104 may include relationship information associating one or more profiles with one or more other profiles. For example, in the case of a public social-network site such as LinkedIn™, the social-network data 104 may identify two profiles as being "connected," which may occur if a first user of one profile sends an invitation to connect to a second user of another profile and the second user accepts. As another example, a company directory may list profiles for two or more individuals and the profiles may be associated with the same sub-group, such as a division, within the company. Social-network data 104 may include information identifying such associations.

Security unit 118 may receive e-mail data 108 (304). For example, security unit 118 may receive e-mail data 108 from e-mail server 106. In some examples, security unit 118 may receive e-mail data 108 as it is created and stored in e-mail server 106 or may receive e-mail data 108 at scheduled periodic intervals, as requested by a user of administrator computer 116, or in any other suitable manner, according to particular needs. As described above with reference to FIG. 1, e-mail data 108 may include, for example, one or more e-mail messages, including content contained in the message, the intended recipient of the message, the identified sender of the message, and a source of the message, including an IP address from which the message originated and/or was sent.

In some examples, security unit 118 may generate a source profile 114 (306). For example, security unit 118 may generate a source profile 114 associated with a particular source based on social-network data 104 and/or e-mail data 108. For example, a source profile 114 may include information from social-network data 104 including pages and/or profiles viewed by the source and/or page content on pages and/or profiles accessed by the source. The source may be identified, for example, based on an IP address and security unit 118 may determine that the IP address has been used to access one or more social-network pages or profiles and may generate a source profile 114 indicating pages and/or profiles viewed from that IP address. The source profile 114 may also include e-mail data 108 associated with the source, including information regarding e-mail messages originating and/or or sent from the source. In some examples, security unit 118 may store the generated source profile 114 in database 112 or any other suitable location.

In some examples, security unit 118 may not generate a source profile 114 for every source in social-network data 104 and/or e-mail data 108 but may instead generate a source profile 114 for some sources based on social-network data 104 and/or e-mail data 108. For example, as described above, social-network data 104 may include page-view information associated with accessed social-network profiles including, for example, profiles associated with an organization. Profiles may be associated with an organization because they are profiles of members of the organization and/or because they are profiles having some type of relationship, as indicated by relationship data, as described above. The page-view information may indicate the number of profiles of the profiles associated with the organization that are accessed by a particular source. Upon determining that a count of the accessed social-network profiles exceeds a threshold level, the security unit 118 may generate a source profile 114 for the source. The threshold may be any suitable number. In some examples, security unit 118 may determine whether the threshold is exceeded within a particular timeframe before generating a source profile. For example, security unit 118 may determine, based on received social-network data 104, that a particular source has accessed three social-network profiles associated with an organization within a week and may, as a result, generate a source profile 118 for the source.

In other examples, a source profile 118 may be generated for a particular source only after a message from the source has been identified as being from a potentially malicious source based on received social-media data 104 and e-mail data 108. The source profile 118 may be stored, such as in database 112, for example, and may be updated periodically and/or as new relevant social-network data 104 and/or e-mail data 108 is received.

Security unit 118 may determine whether an e-mail message is from a potentially malicious source (308). For example, as described above with reference to FIG. 1, security unit 118 may analyze social-network data 104 and e-mail data 108 to determine that the e-mail message is from a potentially malicious source. In some examples, determining whether an e-mail message is from a potentially malicious source may be based, at least in part, on a stored source profile 114. If security unit 118 does not determine that an e-mail message is from a potentially malicious source (NO branch of 208), the operation may continue with security unit 118 continuing to receive social-network data 104 (302) and e-mail data 108 (304). If security unit 118 does determine that an e-mail message is from a potentially malicious source (YES branch of 208), the operation may continue with security unit 118 outputting information identifying the e-mail message as being from a potentially malicious source to e-mail server 106 (310).

In some examples, outputting the information identifying the e-mail message as being from a potentially malicious source may include indicating a type of processing to be performed by e-mail server 106 for the e-mail message, such as blocking, filtering, highlighting, or labeling the e-mail message. In some examples, outputting the information identifying the e-mail message as being from a potentially malicious source may include sending the information to one or more devices including, for example, e-mail server 106, administrator computer 116, and/or one or more devices associated with the intended e-mail recipient. In some examples, a source profile 114 may be generated and/or updated for a source based on determining that an e-mail message from the source was identified as being from a potentially malicious source. In some examples, all future communications from that source may be identified as being from a potentially malicious source based on the generated source profile 114.

In some examples, example operation 300 may include more or fewer steps. In some examples, example operation 300 may include steps performed in any particular order according to particular needs. In some examples, security unit 118 may not generate and store source profiles 114 but may instead determine that an e-mail message is from a potentially malicious source directly from received and/or stored social-network data 104 and/or e-mail data 108.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over a computer-readable medium as one or more instructions or code, and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable gate arrays (FPGAs), or other equivalent integrated or discrete logic circuitry, as well as any combination of such components. Accordingly, the term "processor," as used herein may refer to any of the foregoing structures or any other structure suitable for implementation of the techniques described herein. In addition, in some aspects, the functionality described herein may be provided within dedicated hardware and/or software modules. Also, the techniques could be fully implemented in one or more circuits or logic elements.

The techniques of this disclosure may be implemented in a wide variety of devices or apparatuses, including a wireless communication device or wireless handset, a microprocessor, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described above, in conjunction with suitable software and/or firmware.

Techniques of this disclosure may provide one or more technical advantages. For example, analyzing social-network data 104, including page-view data, page-content data, and relationship data, may allow for more accurately predicting likelihood of a spear-phishing attempt. This more accurate prediction may also allow for more effective prevention of spear-phishing attempts, which may result in reduction in lost resources, including human, capital, and technological resources that may be compromised by successful spear-phishing attempts and/or needed for responding to a successful spear-phishing attempt. More efficient analysis and prevention may result in reduced computer processing and storage resources needed as a result of a spear-phishing attempt.

Various examples have been described. These and other examples are within the scope of the following claims.

What is claimed is:

1. A method comprising:
receiving, by one or more processors of a computing device and from one or more social-network servers, social-network data that identifies at least one potentially malicious source accessing a plurality of social-network profiles for a group of users, wherein the social-network data comprises page-view information associated with accessed social-network profiles of the plurality of social-network profiles;
upon determining that a count of the accessed social-network profiles exceeds a threshold level, generating, by the one or more processors and based on the social-network data, a source profile associated with the at least one potentially malicious source;
receiving, by the one or more processors and from one or more e-mail servers, e-mail data associated with a plurality of e-mail messages received by the group of users;
determining, by the one or more processors and based on the e-mail data and the source profile, that an e-mail message of the plurality of e-mail messages is from the at least one potentially malicious source; and
outputting, by the one or more processors, information identifying the e-mail message as being from the potentially malicious source.

2. The method of claim 1, further comprising
storing the source profile in one or more databases.

3. The method of claim 1,
wherein the social-network data comprises profile-content information associated with accessed social-network profiles of the plurality of social-network profiles; and
wherein determining that the e-mail message is from the at least one potentially malicious source comprises comparing information included in the e-mail message with the profile-content information.

4. The method of claim 1, wherein determining that the e-mail message is from the at least one potentially malicious source comprises:
identifying at least one Internet Protocol (IP) address associated with the at least one potentially malicious source based on the social-network data; and
determining that the e-mail message is sent from the at least one IP address associated with the at least one potentially malicious source.

5. The method of claim 1, wherein outputting the information identifying the e-mail message as being from the potentially malicious source comprises indicating a type of processing for the e-mail message, wherein the type of processing comprises one of blocking, filtering, highlighting, or labeling the e-mail message.

6. The method of claim 1, wherein the social-network data comprises relationship information associating a first one of the plurality of social-network profiles with a second one of the plurality of social-network profiles.

7. The method of claim 1, wherein the plurality of social-network profiles comprise profiles from at least one of:
a company directory; or
a public social-network website.

8. A computing device comprising:
one or more storage unit devices; and
one or more hardware processors in communication with the storage unit devices and configured to:
receive, from one or more social-network sources, social-network data that identifies at least one potentially malicious source accessing a plurality of social-network profiles for a group of users, wherein the social-network data comprises page-view information associated with accessed social-network profiles of the plurality of social-network profiles;
upon determining that a count of the accessed social-network profiles exceeds a threshold level, generate, based on the social-network data, a source profile associated with the at least one potentially malicious source;
receive, from one or more e-mail servers, e-mail data associated with a plurality of e-mail messages received by the group of users;
determine, based on the e-mail data and the source profile, that an e-mail message of the plurality of e-mail messages is from the at least one potentially malicious source; and
output information identifying the e-mail message as being from the potentially malicious source.

9. The computing device of claim 8, wherein the one or more hardware processors are further configured to
store the source profile in one or more databases.

10. The computing device of claim 8,
wherein the social-network data comprises profile-content information associated with accessed social-network profiles of the plurality of social-network profiles; and
wherein the one or more hardware processors are further configured to determine that the e-mail message is from the at least one potentially malicious source by comparing information included in the e-mail message with the profile-content information.

11. The computing device of claim 8, wherein, to determine that the e-mail message is from the at least one potentially malicious source, the one or more hardware processors are further configured to:
identify at least one Internet Protocol (IP) address associated with the at least one potentially malicious source based on the social-network data; and
determine that the e-mail message is sent from the at least one IP address associated with the at least one potentially malicious source.

12. The computing device of claim 8, wherein, to output the information identifying the e-mail message as being from the potentially malicious source, the one or more hardware processors are further configured to indicate a type of processing for the e-mail message, wherein the type of processing comprises one of blocking, filtering, highlighting, or labeling the e-mail message.

13. The computing device of claim 8, wherein the social-network data comprises relationship information associating a first one of the plurality of social-network profiles with a second one of the plurality of social-network profiles.

14. The computing device of claim 8, wherein the plurality of social-network profiles comprises profiles from at least one of:
a company directory; or
a public social-network website.

15. A non-transitory computer-readable storage medium having stored thereon instructions that, when executed, cause a processor to:
  receive, from one or more social-network sources, social-network data that identifies at least one potentially malicious source accessing a plurality of social-network profiles for a group of users, wherein the social-network data comprises page-view information associated with accessed social-network profiles of the plurality of social-network profiles;
  upon determining that a count of the accessed social-network profiles exceeds a threshold level, generate, based on the social-network data, a source profile associated with the at least one potentially malicious source;
  receive, from one or more e-mail servers, e-mail data associated with a plurality of e-mail messages received by the group of users;
  determine, based on the e-mail data and the source profile, that an e-mail message of the plurality of e-mail messages is from the at least one potentially malicious source; and
  output information identifying the e-mail message as being from the potentially malicious source.

16. The non-transitory computer-readable storage medium of claim 15, further having stored thereon instructions that, when executed, cause a processor to
  store the source profile in one or more databases.

17. The non-transitory computer-readable storage medium of claim 15,
  wherein the social-network data comprises profile-content information associated with accessed social-network profiles of the plurality of social-network profiles; and
  wherein the non-transitory computer-readable storage medium further has stored thereon instructions that, when executed, cause the processor to determine that the e-mail message is from the at least one potentially malicious source by comparing information included in the e-mail message with the profile-content information.

* * * * *